US011916216B2

(12) United States Patent
Sheerin

(10) Patent No.: US 11,916,216 B2
(45) Date of Patent: Feb. 27, 2024

(54) METAL AIR BATTERY DEVICE

(71) Applicant: ALUMAPOWER CORPORATION, Huntsville (CA)

(72) Inventor: Geoffrey T. Sheerin, Sarnia (CA)

(73) Assignee: AlumaPower Corporation, Huntsville (CA)

( * ) Notice: Subject to any disclaimer, the term of this patent is extended or adjusted under 35 U.S.C. 154(b) by 381 days.

(21) Appl. No.: 17/270,286

(22) PCT Filed: Aug. 22, 2019

(86) PCT No.: PCT/IB2019/000935
§ 371 (c)(1),
(2) Date: Feb. 22, 2021

(87) PCT Pub. No.: WO2020/039254
PCT Pub. Date: Feb. 27, 2020

(65) Prior Publication Data
US 2021/0184297 A1    Jun. 17, 2021

Related U.S. Application Data

(60) Provisional application No. 62/720,959, filed on Aug. 22, 2018.

(51) Int. Cl.
*H01M 12/06* (2006.01)
*H01M 4/02* (2006.01)
(Continued)

(52) U.S. Cl.
CPC ........... *H01M 12/065* (2013.01); *H01M 4/38* (2013.01); *H01M 4/96* (2013.01); *H01M 12/02* (2013.01);
(Continued)

(58) Field of Classification Search
CPC ...... H01M 12/02; H01M 12/065; H01M 4/38; H01M 4/96
See application file for complete search history.

(56) References Cited

U.S. PATENT DOCUMENTS 4,246,324 A    1/1981    de Nora et al.
4,448,858 A    5/1984    Graf et al.
(Continued)

FOREIGN PATENT DOCUMENTS

CA    2368209    9/2000
CA    3078423    7/2021
(Continued)

OTHER PUBLICATIONS

EPO; Extended European Search Report dated May 3, 2022 for related European Application 19852156.9; 9 pages.
(Continued)

*Primary Examiner* — Karie O'Neill Apicella
(74) *Attorney, Agent, or Firm* — Peter J. Mikesell; Schmeiser, Olsen & Watts, LLP

(57) ABSTRACT

A metal air battery system comprised of anode/cathode assembly with air gun plenums mounted on both sides of the anode. The anode is mounted in a battery cell chamber that holds the anode parallel with the cathode. The anode is able to move in and out of the battery cell chamber while the air gun plenums emit high pressure air for the purpose of wiping clean liquid electrolyte from the surface of each anode to provide for rapid shutdown of chemical reactions that produce hydrogen gas and electric current.

16 Claims, 7 Drawing Sheets

(51) Int. Cl.
  *H01M 4/38* (2006.01)
  *H01M 4/86* (2006.01)
  *H01M 4/96* (2006.01)
  *H01M 12/02* (2006.01)

(52) U.S. Cl.
  CPC .............. *H01M 2004/027* (2013.01); *H01M 2004/8689* (2013.01)

(56) References Cited

U.S. PATENT DOCUMENTS

| | | |
|---|---|---|
| 4,950,561 A | 8/1990 | Niksa et al. |
| 5,615,717 A | 4/1997 | Cheiky |
| 6,384,569 B1 | 5/2002 | Pintz et al. |
| 6,692,867 B2 | 2/2004 | Nark |
| 6,921,985 B2 | 7/2005 | Janssen |
| 7,629,705 B2 | 12/2009 | Barker |
| 7,638,241 B2 | 12/2009 | Lee |
| 8,691,446 B2 | 4/2014 | Sakata |
| 8,906,563 B2 | 12/2014 | Friesen et al. |
| 8,941,363 B2 | 1/2015 | Kruglick |
| 9,077,035 B2 | 7/2015 | Kita |
| 9,166,251 B2 | 10/2015 | Katayama |
| 9,224,516 B2 | 12/2015 | Nelson |
| 9,350,019 B2 | 5/2016 | Sakata |
| 9,627,726 B2 | 4/2017 | Tzidon et al. |
| 9,698,398 B2 | 7/2017 | Kong |
| 9,742,048 B2 | 8/2017 | Yoshida et al. |
| RE47,520 E | 7/2019 | Zhang |
| 10,930,932 B2 | 2/2021 | Tan |
| 2015/0207191 A1* | 7/2015 | Kisdarjono ......... H01M 6/5077 429/406 |
| 2016/0294027 A1* | 10/2016 | Toussaint .............. H01M 12/08 |
| 2017/0240291 A1 | 8/2017 | Kim |
| 2017/0309981 A1 | 10/2017 | Miller et al. |

FOREIGN PATENT DOCUMENTS

| | | |
|---|---|---|
| CN | 108305407 | 7/2018 |
| EP | 1029381 | 7/2002 |
| JP | 2001135363 | 5/2001 |
| JP | 2013150440 | 8/2013 |
| JP | 2017109553 | 6/2017 |
| KR | 20000001198 A | 1/2000 |

OTHER PUBLICATIONS

ISA/CA; International Search Report/Written Opinion for corresponding International Application PCT/IB2019/000935 dated Jan. 21, 2020; 9 pages.

ISA/CA; International Search Report/Written Opinion for related International Application PCT/IB2021/062277 dated Apr. 14, 2022.

EPO; Extended European Search Report dated Apr. 4, 2022 for related European Application 19894838.2I.

* cited by examiner

METAL AIR BATTERY DEVICE

CROSS-REFERENCE TO RELATED APPLICATIONS

This application claims priority to and is a non-provisional of U.S. Patent Application 62/720,959 (filed Aug. 22, 2018), the entirety of which is incorporated herein by reference.

BACKGROUND OF THE INVENTION

The subject matter disclosed herein relates to metal air batteries. Metal air batteries provide high energy density power sources that show promising applications as mobile and stationary distributed power sources. The batteries have the potential to replace the internal combustion engines found in hybrid cars and aircraft since the energy density, efficiency of conversion approach those of hydrocarbon fuels.

FIG. 1 depicts a schematic representation of a conventional aluminum-oxygen cell system 100. The system 100 comprises an air metal battery 102, an air blower 104 or an oxygen supply 106 and a carbon dioxide scrubber 108. An electrolyte tank 110 with a filter 112 is also present. A coolant system with a heat exchanger 114 and pump 116 is provided. An electrolyte pump 118 sends electrolyte through the air metal battery 102 and a gas separator 120. A knockout tank 122 and hydrogen disposal system 124 are also present. A specific air battery cell is shown in FIG. 2.

FIG. 2 depicts a portion of the air metal battery 102 in further detail. A metal anode 200, an electrolyte 202 and an air breathing cathode 204 is shown. The air breathing cathode 204 may contain a conductive charge collecting screen embedded in a conductive matrix that contains a catalyst that promotes the reduction of oxygen. There is a hydrophobic layer that is porous to gas but not the liquid electrolyte. The oxygen needed for the chemical reaction can penetrate the air breathing cathode 204 but still hold the liquid electrolyte in place against the surface of the anode. The metal anode 200 is made from a variety of metals such as zinc, magnesium, iron and aluminum. In one embodiment, the metal anode 200 is aluminum due to the low cost and density of the material.

The metal anode is consumed during the operation of metal air batteries and causes some issues with performance and reliability of the system. When the electrical circuit in a metal air battery is interrupted (turned off) the electrolyte reacts instantly with the metal to produce dangerous volumes of hydrogen gas that must be vented from the battery system. The hydrogen bubbles collect in the electrolyte rapidly and increase the electrical resistance of the battery so that even if the battery is quickly turned back on full power is not available until the electrolyte with hydrogen bubbles is flushed from the system. This pumping and flushing of the electrolyte requires a "knockout" system that separates gas and liquid so hydrogen gas can be safely removed from the system. Knockout system normally uses some type of cascade of liquid through baffles to allow for departure of gas out of solution. Attempts to drain the electrolyte out of a metal air battery does shut down the power output but has been found to result in small droplets and liquid film coatings of the metal anode that produce large amounts of hydrogen gas and corrode the metal unevenly producing pits and voids that reduce the efficiency and amount of power available from the system. As a result of these problems all metal air batteries are designed to be turned on and run until the metal anode is spent. In summary it is very difficult to turn off a metal air battery and then turn it on again without damage to the complete system so they are left on for the lifetime of the anode.

The discussion above is merely provided for general background information and is not intended to be used as an aid in determining the scope of the claimed subject matter.

SUMMARY

A metal air battery system comprised of anode/cathode assembly with air gun plenums mounted on both sides of the anode. The anode is mounted in a battery cell chamber that holds the anode parallel with the cathode. The anode is able to move in and out of the battery cell chamber while the air gun plenums emit high pressure air for the purpose of wiping clean liquid electrolyte from the surface of each anode to provide for rapid shutdown of chemical reactions that produce hydrogen gas and electric current.

In a first embodiment, a method for halting operation of a metal air battery is provided. The method comprising: withdrawing an anode from a battery cell chamber such that less than 20% of a length of the anode remains within the battery cell chamber, wherein the anode is a rectangular block with a first flat surface and a second flat surface, the first flat surface and the second flat surface being opposite; the battery cell chamber comprises a slot for receiving the anode; a first cathode plate that is parallel and proximate to the first flat surface of the anode, thereby forming a first electrolyte chamber; a second cathode plate that is parallel and proximate to the second flat surface of the anode, thereby forming a second electrolyte chamber; a first air gun plenum and a second air gun plenum, each disposed at the top of the battery cell chamber and on opposing sides of the anode; supplying pressurized air to the first air gun plenum and the second air gun plenum, thereby supplying air flow to the first flat surface and the second flat surface, respectively; wherein the step of withdrawing and the step of supplying occur simultaneously such that electrolyte is removed from the first flat surface and the second flat surface and pushed into the first electrolyte chamber and the second electrolyte chamber, respectively, and thereby halting operation of the metal air battery.

In a second embodiment, an air metal battery is provided. The air metal battery comprising: an anode that is a rectangular block with a first flat surface and a second flat surface, the first flat surface and the second flat surface being opposite; a battery cell chamber comprising: a slot for receiving the anode; a first cathode plate that is parallel and proximate to the first flat surface of the anode, thereby forming a first electrolyte chamber; a second cathode plate that is parallel and proximate to the second flat surface of the anode, thereby forming a second electrolyte chamber; a first air gun plenum and a second air gun plenum, each disposed at the top of the battery cell chamber and on opposing sides of the anode.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

The present disclosure pertains to a metal air battery that provides for complete rapid shutdown of power without parasitic corrosion and production of dangerous hydrogen gas. It also provides for the rapid restart to full power and production of constant power output throughout the consumption of the metal anode. Some embodiments of the disclosed air battery provide for a low-cost metal anode configuration that does not need high integrity edge seals and that can be automatically loaded into the metal air battery system for the purposes of extended operation.

The anode/cathode configuration of the disclosed metal air battery and its dynamic operation provide solutions to many conventional problems outlined in the background above. The battery can use a variety of metal anodes such as zinc, lithium, iron etc. In one embodiment, the metal used is aluminum due to low cost, weight and easy availability with low environmental impact in production and storage.

Figure 1:
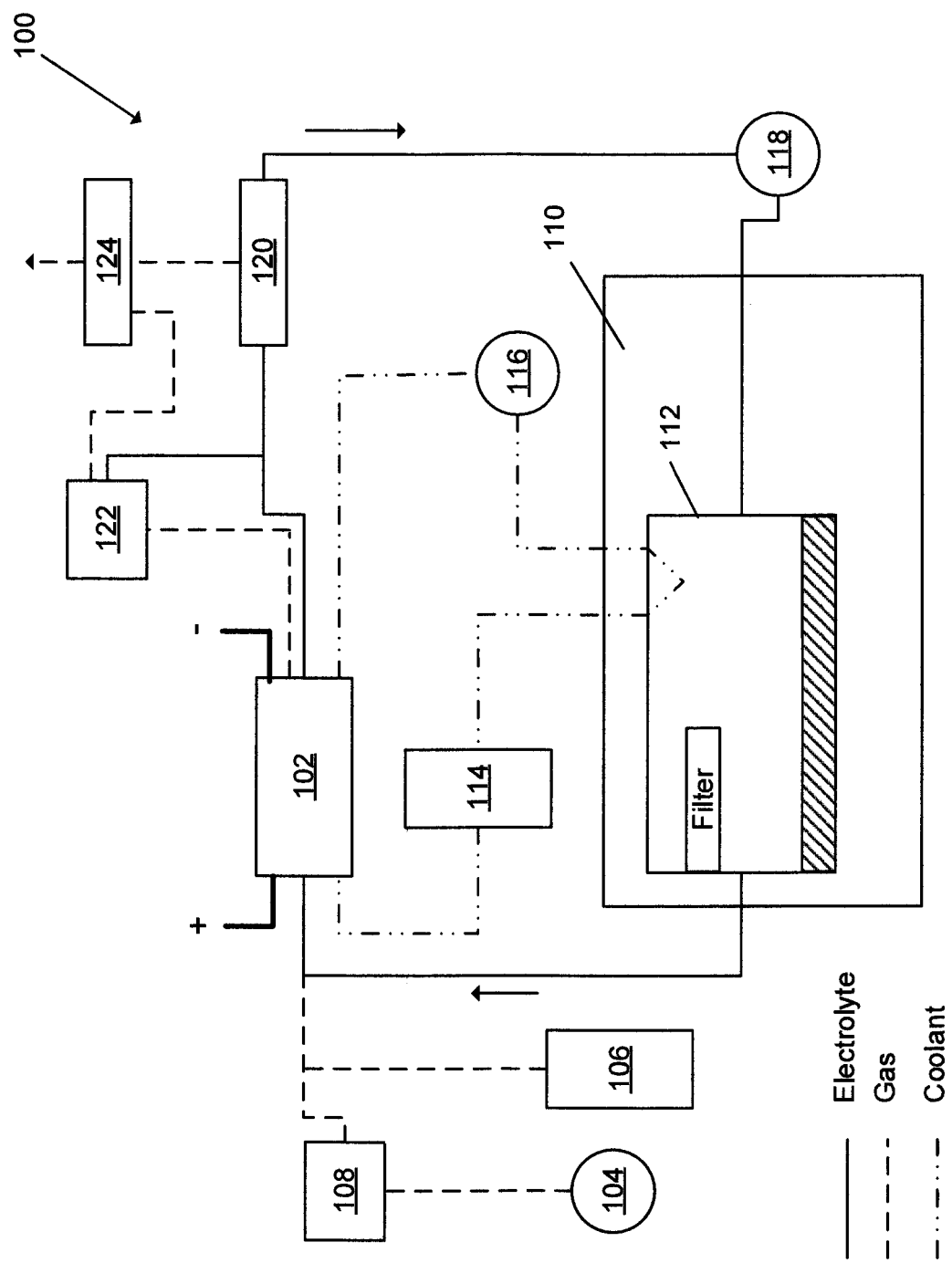
FIG. 1 is a schematic depiction of a system that utilizes a metal-air battery.
Figure 2:
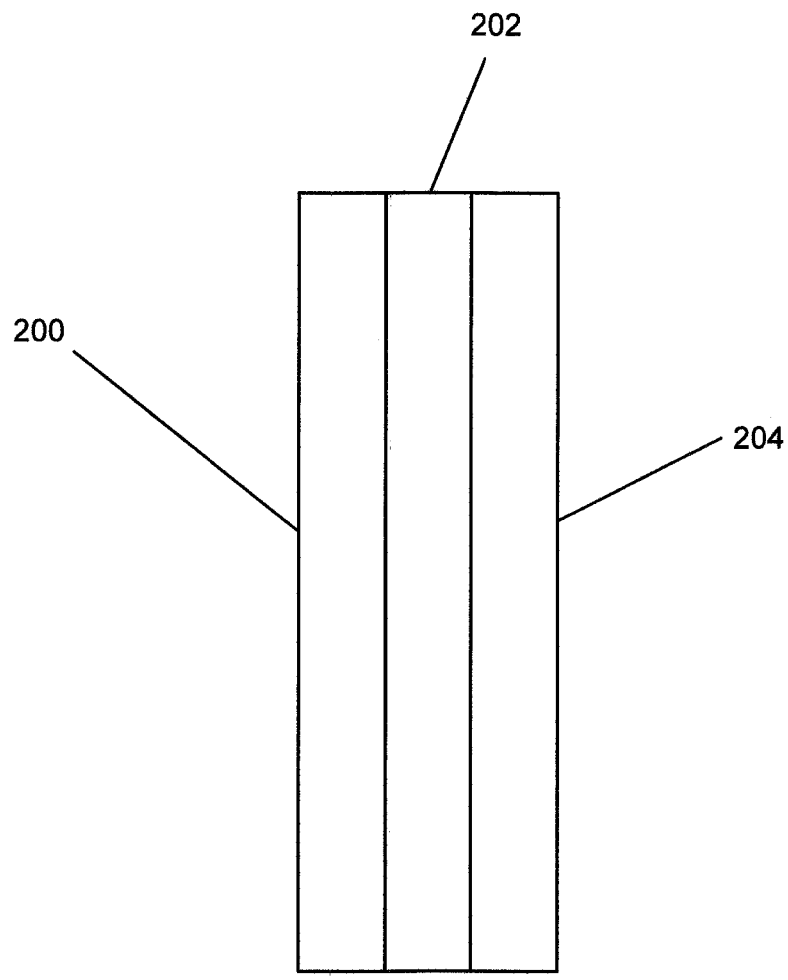
FIG. 2 is schematic of a metal-air battery.
Figure 3:
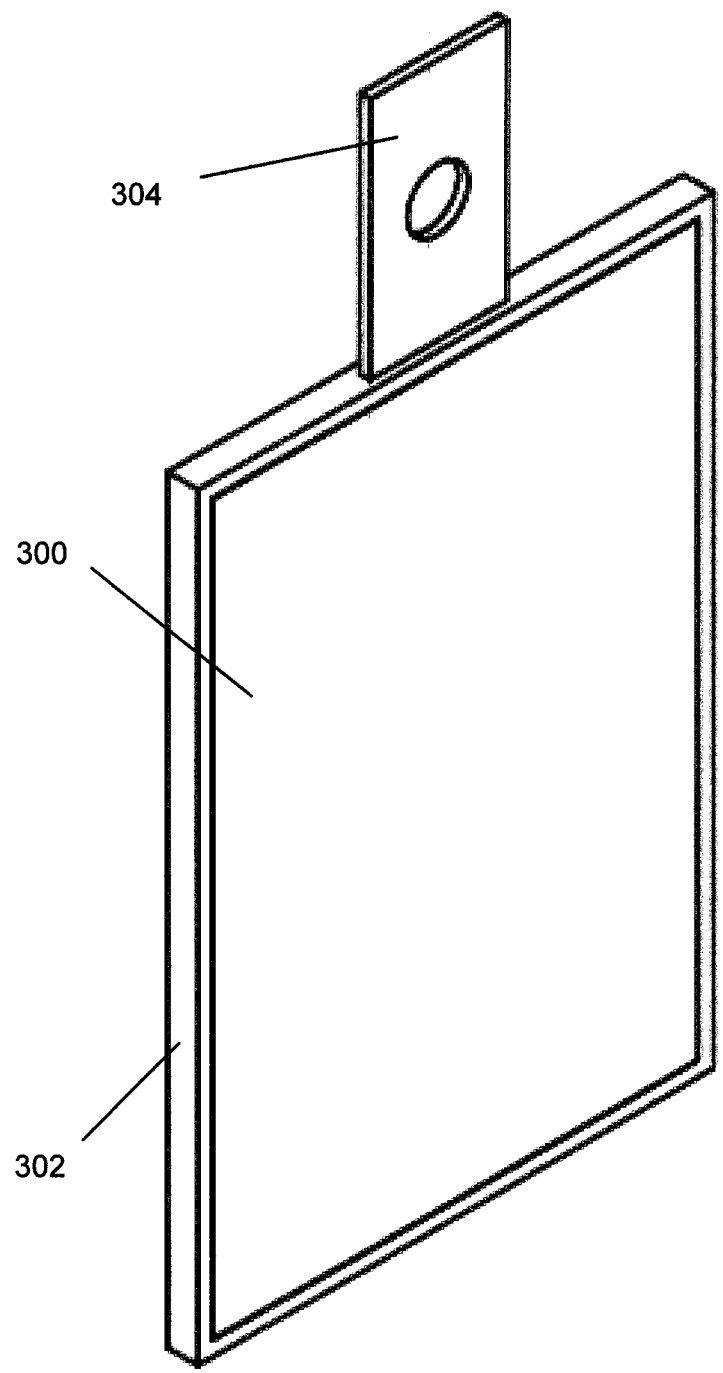
FIG. 3 depicts an anode for use with a battery cell chamber.

Referring to FIG. 3, in one embodiment, the battery comprises a rectangular anode 300 of aluminum bonded to a plastic frame 302 that covers the side and sharp edges of the anode 300. The anode 300 is a rectangular block with a first flat surface and a second flat surface that are opposite one another. A tab 304 extends from the top of the plastic frame 302 and provides both a mechanical and electrical connection to the anode 300. The tab 304 is monolithic with regard to the anode 300 such that the tab 304 extends through the plastic frame 302. The tab 304 allows for the anode 300 to be pulled out of the battery in a few seconds. In one embodiment, the anode 300 is a 5000 or 6000 series aluminum with the rectangular anode bonded or glued to an injection molded PVC plastic frame 302.

Figure 4:
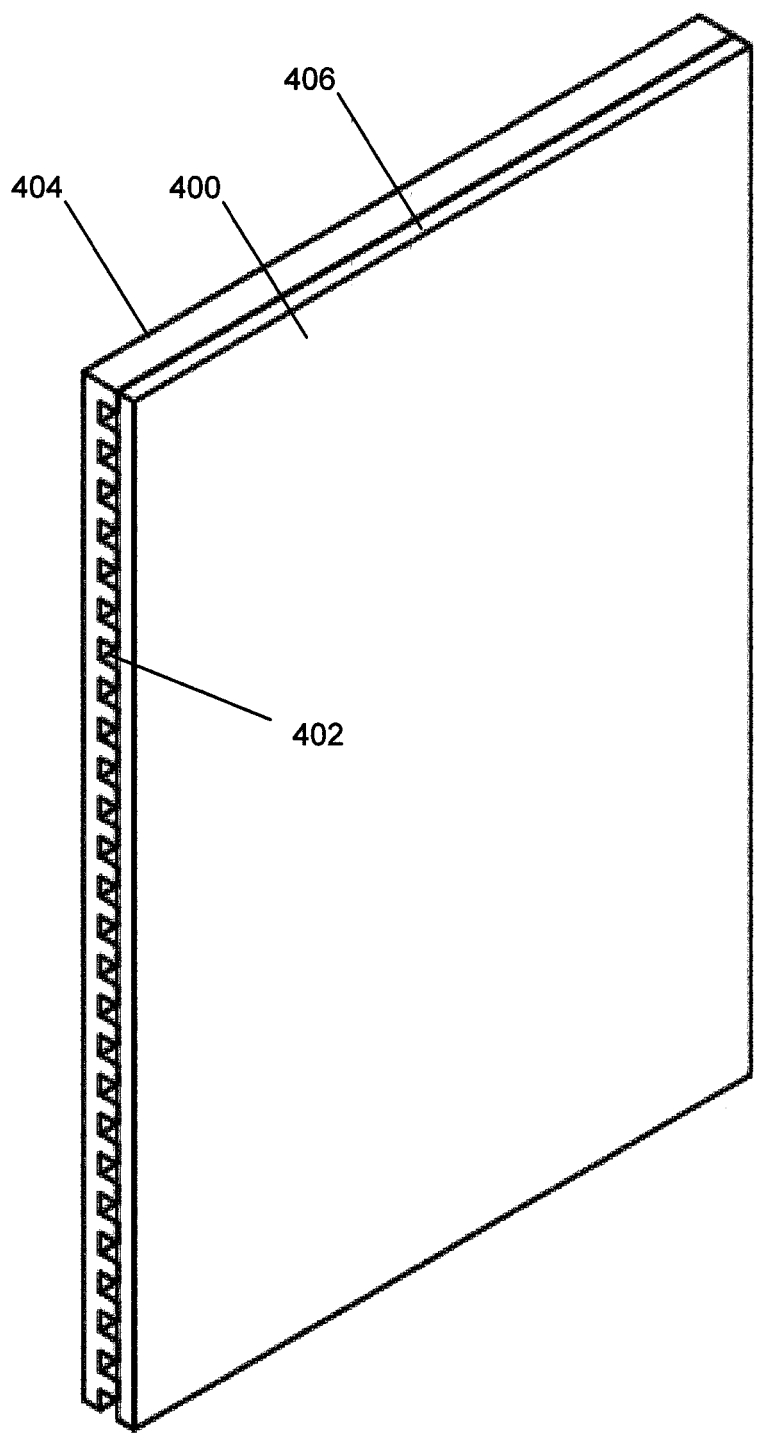
FIG. 4 depicts a cathode for use with the battery cell chamber.

FIG. 4 depicts a cathode plate 400. The cathode plate 400 has air channels 402 that allow for oxygen to enter the cathode matrix and react with the battery chemistry. The air channels 402 provide a waffle-type pattern that can be seen at the edge of the cathode 400 in FIG. 4. A back plate 404 to the cathode 400 is formed so the air channels 402 are open to the air. The cathode front 406 is a flat block on the front that, when attached, forms one side of the air channel 402 and is the side that feeds oxygen to the back of the cathode 400. The cathode plate 400 may be manufactured from a carbon powder matrix mixed with a hydrophobic binder and a catalyst material along with embedded metal wire charge collectors. Other cathode materials well known to those skilled in the art can be applied to the manufacture of the cathode plate 400. Each cathode plate 400 is made of carbon powder with a hydrophobic binder such as a polytetrafluoroethylene sold under the brand name TEFLON® that allows oxygen to permeate the surface but prevents liquid from leaking out of the battery cell chamber 500 (see FIG. 5). In one embodiment, liquid TEFLON® is mixed with carbon powder at about a 20% (m/m) and allowed to dry to form a hydrophobic barrier to liquid.

Figure 5:
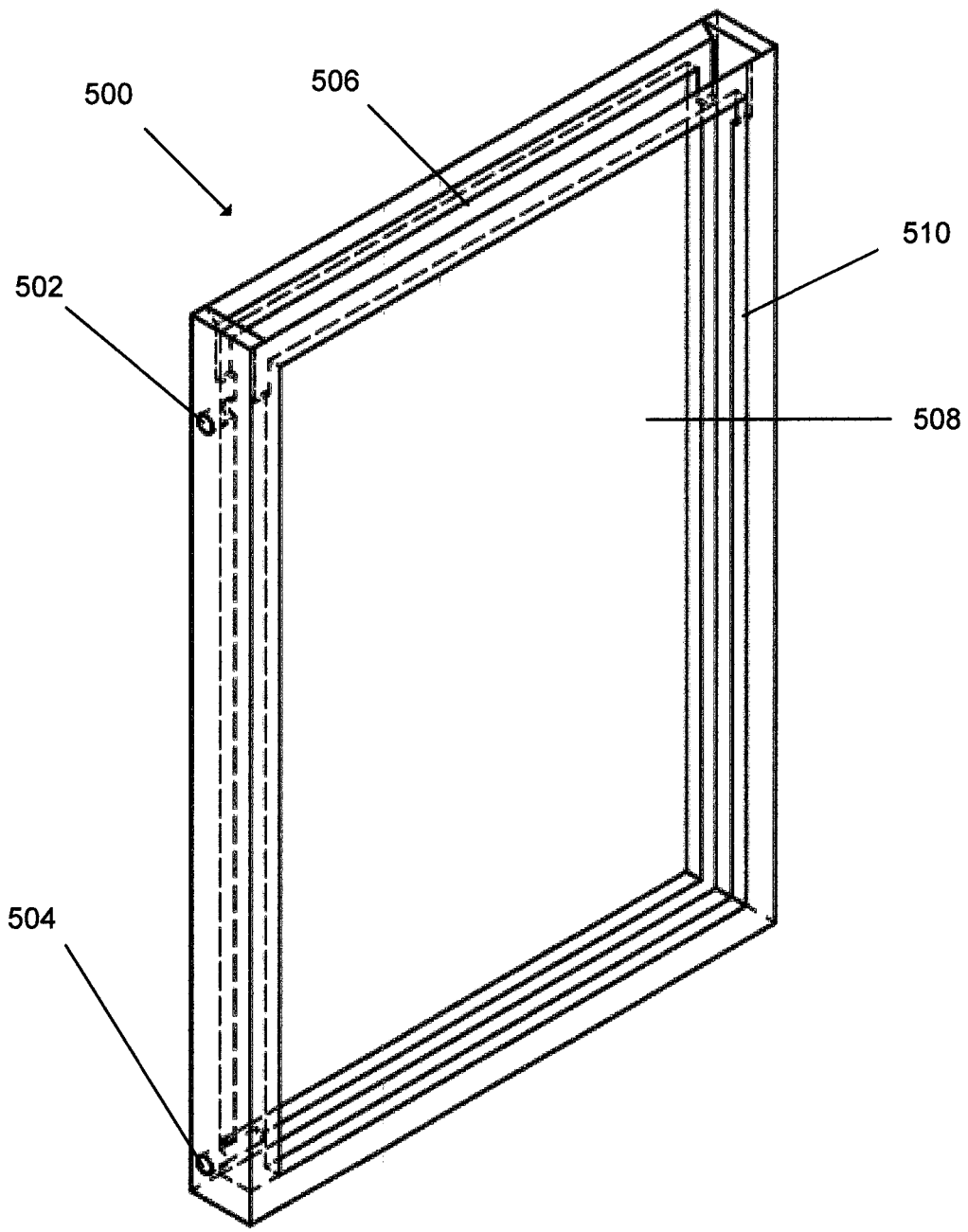
FIG. 5 depicts the battery cell chamber.
Figure 6:
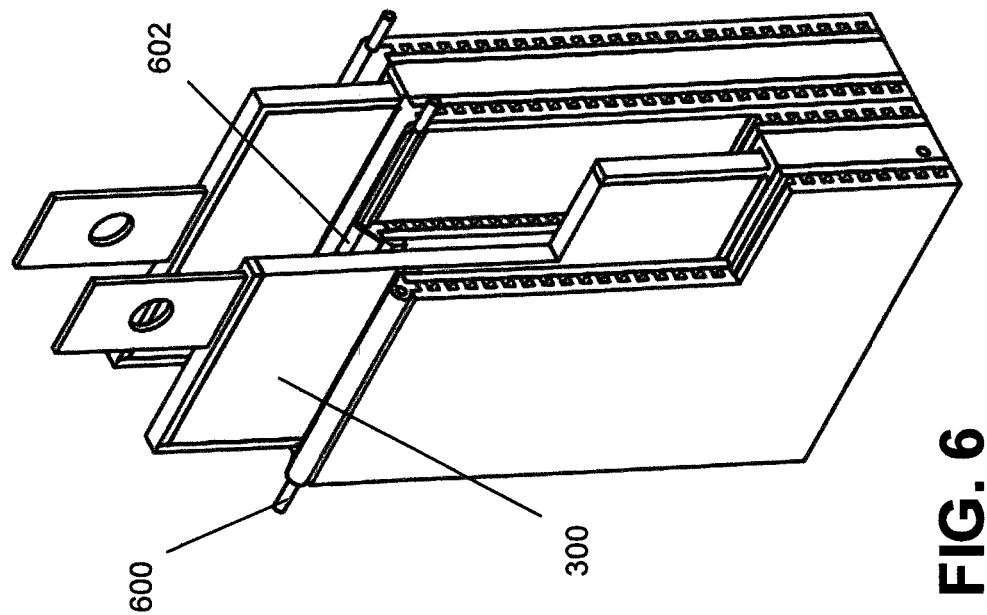
FIG. 6 depicts the battery cell chamber in use showing the anode being withdrawn.
Figure 6:
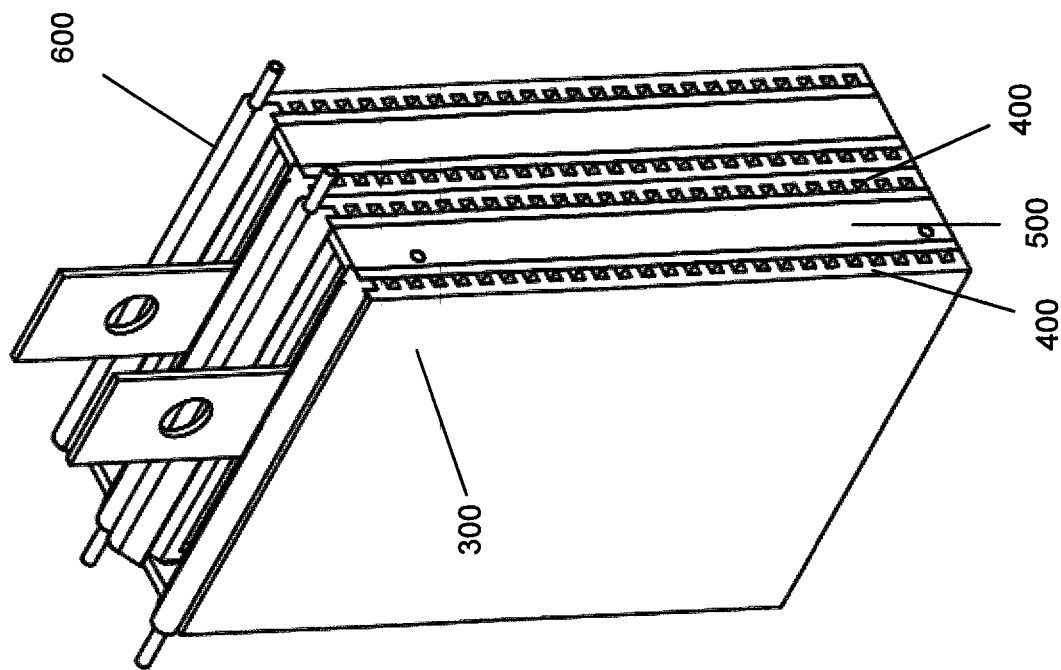

FIG. 5 depicts a battery cell chamber 500. The anode 300 (not shown in FIG. 5) is inserted into a slot 506. The battery cell chamber 500 has two open faces 508 wherein the cathode plate 400 (not shown in FIG. 5) will be attached. The spacer 510 provides a gap between a surface of the anode 300 and a surface of the cathode plate 400 which functions as the electrolyte chamber 700 (see FIG. 7). FIG. 6 depicts the completed assembly. On the side of the battery cell chamber 500 are inlets 502 and outlets 504 for circulation of battery electrolyte with an electrolyte pump.

FIG. 6 illustrates the anode 300 inserted into a single battery cell chamber 500 that has cathode plates 400 (FIG. 4) attached to each side of the battery cell chamber 500 and sealed so the unit is liquid tight. The plastic frame 302 has a tab 304 on the upper surface that is electrically connected to the anode 300 as well as being used for mechanical extraction of the anode 300. When the anode 300 is pushed into the battery cell chamber 500 it forms two chambers on each side of the anode 300 with juxtaposed cathode plates 400 on each side. The anode 300 and the cathode plate 400 are parallel one another.

Referring to FIG. 6, on top of and to each side of the battery cell are mounted two air gun plenums 600, 602. The air gun plenums 600, 602 are on opposite sides of the anode 300. These air gun plenums 60Q, 602 provide an even sheet of high-pressure air on shutdown of the battery for the purposes of wiping clean and drying the anode 300 such that the battery electrolyte is rapidly removed. The battery is started by moving the anode 300 down into the battery cell chamber 500 and starting the flow of electrolyte. To shut down the battery the electrolyte is drained out of the battery cell chamber 500, the air gun plenums 600, 602 are simultaneously actuated and the anode 300 is pulled out past the air gun plenums 600, 602 so the surface is wiped clean and dry of electrolyte.

Figure 7:
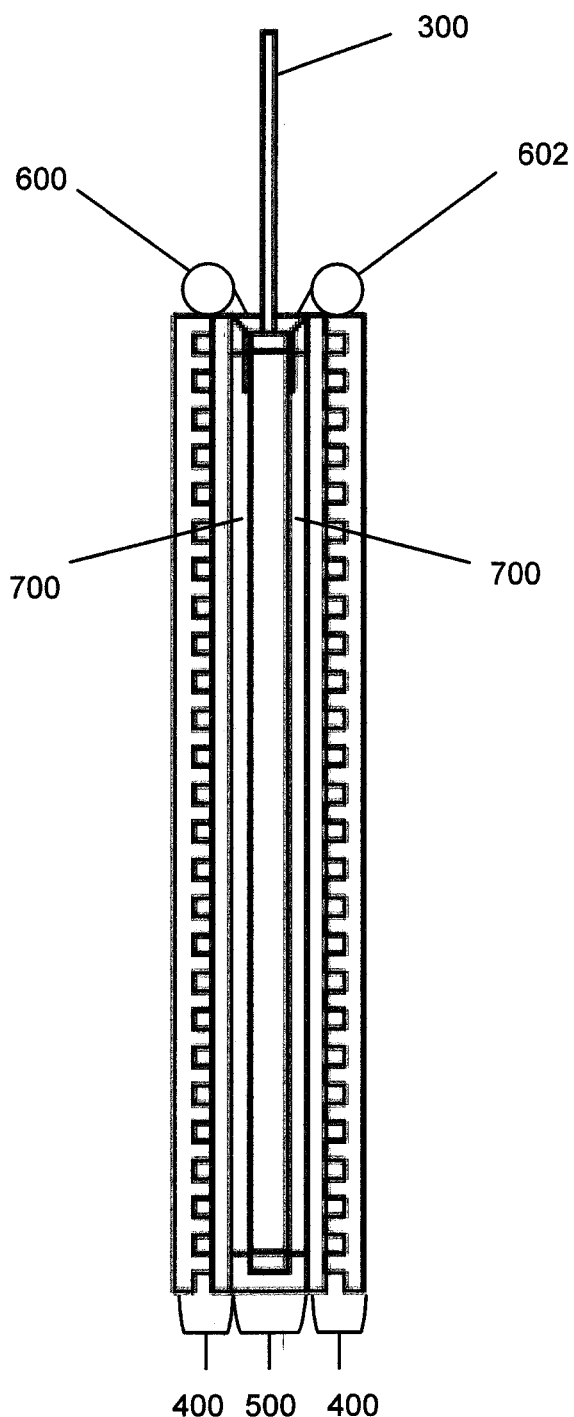
FIG. 7 depicts the battery cell chamber with the anode and cathode plate inserted.

FIG. 7 shows the electrolyte chambers 700 formed on each side of the anode 300 after insertion of the anode 300 into the battery cell chamber 500. The electrolyte chamber 700 is a few millimeters wide (e.g. 1-3 mm) and formed with the battery cell chamber 500 as side walls and the cathode plate 400 and anode 300 as endplates forming the electrolyte chamber that contains electrolyte. This chamber is on either side of the anode 300 that acts as a common wall for both sides.

The air gun plenums 600, 602 have a continuous gap that extends over the width of the anode 300 that generates a curtain of high flow air. This high flow air (e.g. about 7 kPa provides about air with a velocity of about 152 meters per second flow rate) impacts the surface of the anode 300 as it is retracted and pushes the film of electrolyte down off the anode 300 and back into the electrolyte chamber 700. In one embodiment, the air flows at a velocity of at least 100 meters per second and less than 1000 meters per second. The extraction rate may be, for example, approximately 2.5 cm per second meaning that a 15.2 cm long anode 300 will allow for battery shutdown in about 6 seconds. For example, the anode may be pulled out in between 3 seconds and 10 seconds. In another embodiment, the anode may be pulled out in between 3 seconds and 6 seconds. The extraction may leave a portion (e.g. more than 1% but less than 20% of total length) of the anode 300 within the battery cell chamber 500. In one embodiment, more than 1% but less than 10% remains within the battery cell chamber 500. This facilitates re-insertion of the anode 300 into the battery cell chamber 500. The advantage to the air curtain is no matter what shape the surface of the anode 300 has adopted due to galvanic corrosion the air will conform to the surface shape and clear the electrolyte from the anode 300. With the anode 300 now clean and dry the battery can wait until power is need again. The anode 300 can be inserted into the battery in a few seconds such that the battery turned on in less time than was required to turn the battery off. It will be apparent to those skilled in the art that any number of mechanisms can be used to pull the anode 300 in and out of the battery cell chamber 500. For example, in one embodiment, pneumatic cylinders may be used to pull the anode 300 in and out of the battery cell chamber 500. These pneumatic cylinders can also provide air to the air gun plenums 600, 602.

Multiple battery cell chamber can be arranged in electrical series or parallel with one another. In the embodiment of FIG. 6, two such battery cell chambers are stacked in a single assembly. In other embodiments, three or more battery cell chambers are stacked in a single assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for halting operation of a metal air battery, the method comprising:
    withdrawing an anode from a battery cell chamber such that less than 20% of a length of the anode remains within the battery cell chamber, wherein
        the anode is a rectangular block with a first flat surface and a second flat surface, the first flat surface and the second flat surface being opposite;
        the battery cell chamber comprises
            a slot for removably receiving the anode;
            a first cathode plate that is parallel and proximate to the first flat surface of the anode, thereby forming a first electrolyte chamber;
            a second cathode plate that is parallel and proximate to the second flat surface of the anode, thereby forming a second electrolyte chamber;
            a first air gun plenum and a second air gun plenum, each disposed at the top of the battery cell chamber and on opposing sides of the anode, each configured to provide an even sheet of high-pressure air to the anode such that liquid electrolyte is removed from the anode by the sheet of high-pressure air when the anode is removed from the slot;
    supplying pressurized air to the first air gun plenum and the second air gun plenum, thereby supplying air flow to the first flat surface and the second flat surface, respectively;
    wherein the step of withdrawing and the step of supplying occur simultaneously such that electrolyte is removed from the first flat surface and the second flat surface and pushed into the first electrolyte chamber and the second electrolyte chamber, respectively, and thereby halting operation of the metal air battery.

2. The method as recited in claim 1, wherein the air flow has a velocity of at least 100 meters per second.

3. The method as recited in claim 1, wherein the step of withdrawing and the step of supplying occur simultaneously over a period of between 3 seconds and 10 seconds.

4. The method as recited in claim 1, wherein at least 1% but less than 20% of a length of the anode remains within the battery cell chamber after the method is complete.

5. The method as recited in claim 1, wherein at least 1% but less than 10% of a length of the anode remains within the battery cell chamber after the method is complete.

6. The method as recited in claim 1, further comprising removing electrolyte from the first electrolyte chamber and the second electrolyte chamber through an electrolyte outlet in the battery cell chamber.

7. The method as recited in claim 1, wherein the anode is an aluminum anode.

8. The method as recited in claim 1, wherein the first cathode plate comprises powdered carbon and polytetrafluoroethylene.

9. The method as recited in claim 1, wherein the first cathode plate comprises a flat block and a plurality of air channels on a back side of the flat block.

10. The method as recited in claim 1, further comprising a plurality of the battery cell chamber, each with a respective anode, wherein the step of withdrawing and the step of supplying occur simultaneously for all anodes.

11. An air metal battery comprising:
    an anode that is a rectangular block with a first flat surface and a second flat surface, the first flat surface and the second flat surface being opposite;
    a battery cell chamber comprising:
        a slot for removably receiving the anode;
        a first cathode plate that is parallel and proximate to the first flat surface of the anode, thereby forming a first electrolyte chamber;
        a second cathode plate that is parallel and proximate to the second flat surface of the anode, thereby forming a second electrolyte chamber;
        a first air gun plenum and a second air gun plenum, each disposed at the top of the battery cell chamber and on opposing sides of the anode, each configured to provide an even sheet of high-pressure air to the anode such that liquid electrolyte is removed from the anode by the sheet of high-pressure air when the anode is removed from the slot.

12. The air metal battery as recited in claim 11, wherein the anode is an aluminum anode.

13. The air metal battery as recited in claim 11, wherein the first cathode plate comprises powdered carbon and polytetrafluoroethylene.

14. The air metal battery as recited in claim 11, wherein the first cathode plate comprises a flat block and a plurality of air channels on a back side of the flat block.

15. The method as recited in claim 1, wherein the sheet of high-pressure air applies a pressure of at least 7 kPa to the anode.

16. The air metal battery as recited in claim 11, wherein the sheet of high-pressure air applies a pressure of at least 7 kPa to the anode.

* * * * *